United States Patent [19]
Shows

[11] Patent Number: 4,502,827
[45] Date of Patent: Mar. 5, 1985

[54] TRANSPORTER FOR LINEAR POCKET FEEDER
[75] Inventor: Everett W. Shows, Lake Orion, Mich.
[73] Assignee: General Motors Corporation, Detroit, Mich.
[21] Appl. No.: 519,026
[22] Filed: Aug. 1, 1983
[51] Int. Cl.³ .............................................. F23D 1/00
[52] U.S. Cl. .................................. 414/217; 198/716; 222/636; 414/586
[58] Field of Search ............... 414/217, 586; 198/716, 198/733, 643; 239/651; 222/415, 636

[56] References Cited
U.S. PATENT DOCUMENTS

| | | | |
|---|---|---|---|
| 1,540,681 | 6/1925 | Detaint | 198/643 |
| 2,326,535 | 8/1943 | Hapman | 198/203 |
| 2,556,183 | 6/1951 | Hapman | 198/168 |
| 2,595,941 | 5/1952 | Hapman | 198/733 |
| 2,609,081 | 9/1952 | Hapman | 198/733 |
| 2,907,480 | 10/1959 | Vincent | 414/217 |
| 4,342,428 | 8/1982 | Kosek | 239/651 |
| 4,379,670 | 4/1983 | Hannoosh et al. | 414/217 |

Primary Examiner—Joseph E. Valenza
Assistant Examiner—Ken Muncy
Attorney, Agent, or Firm—Saul Schwartz

[57] ABSTRACT

An endless loop transporter for a linear pocket feeder especially for metering powdered coal from a reservoir at atmospheric pressure to a supply duct to a gas turbine compressor at a substantially higher pressure, the transporter including a flexible wire core, a plurality of primary discs loosely received on the core, a plurality of small spacer rings tightly received on the core in compression between the primary discs to form with the discs a plurality of closely spaced transport annuli, and a plurality of secondary discs substituted for a corresponding number of primary discs at uniform intervals along the transporter. The secondary discs carry seal rings which slidably seal against the surface of a tube between the reservoir and the supply duct to form an outside pressure seal between the areas of high and low pressure.

3 Claims, 5 Drawing Figures

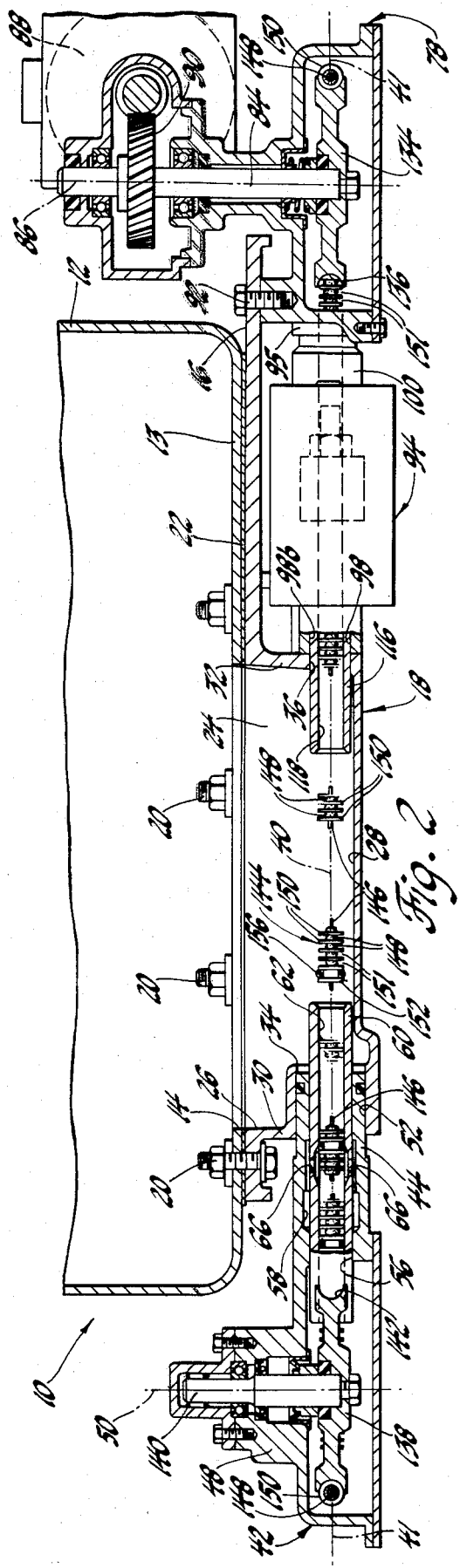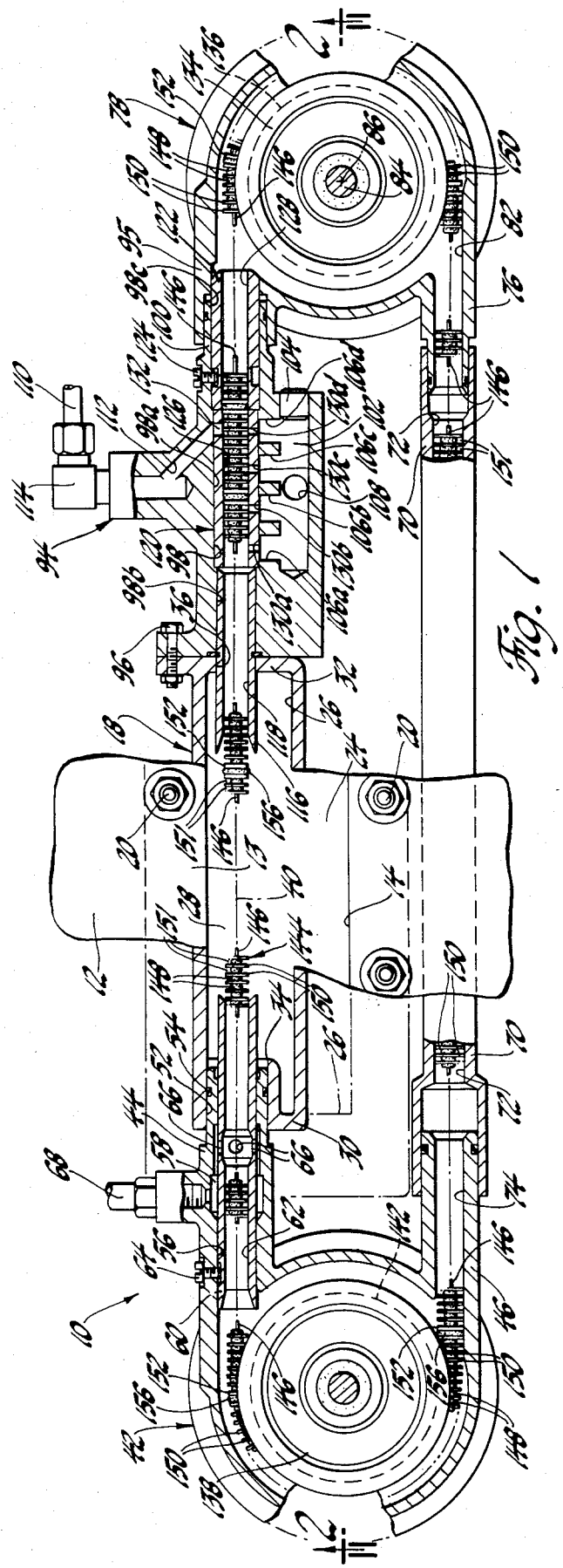
Fig. 1
Fig. 2

TRANSPORTER FOR LINEAR POCKET FEEDER

BACKGROUND OF THE INVENTION

1. Field of the Invention

This invention relates generally to gas turbine engines wherein motive fluid is generated by combustion of finely powdered coal and, more particularly, to an improvement in linear pocket feeders for metering the powdered coal to the combustor of the engine.

2. Description of the Prior Art

U.S. Pat. No. 4,342,428, issued on Aug. 3, 1982 to Thomas P. Kosek and assigned to the assignee of this invention, disclosed a powdered coal metering system for an automotive gas turbine engine wherein a linear pocket feeder transports the powdered coal from a reservoir at atmospheric pressure to a supply duct leading to the engine's combustor at a pressure exceeding the engine's compressor discharge pressure. In Kosek's linear pocket feeder, an endless chain with spherical or disc-like flights fixed thereon is pulled through a tube extending between the reservoir and a port to the supply duct. The flights seal against the inside diameter of the tube to isolate the high pressure duct from the reservoir while the powder is carried between the flights. While this and similar linear pocket systems function as intended, the relatively large quantities of powder carried between the flights tend to eject from the feeder into the supply duct en masse, causing a noticeable pulse in the flame in the combustor. A linear pocket feeder according to this invention represents an improvement over these known structures through material reduction in flame pulsation.

SUMMARY OF THE INVENTION

Accordingly, the primary feature of this invention is that it provides a new and improved linear pocket feeder for transporting finely powdered material from a reservoir at low or atmospheric pressure to a supply duct at a significantly higher pressure. Another feature of this invention is that it provides a new and improved linear pocket feeder especially adapted for transporting finely powdered coal from a reservoir to a supply duct leading to the combustor of a gas turbine engine. Yet another feature of this invention resides in the provision in the new and improved feeder of a transporter including a plurality of primary discs loosely received on a flexible core and separated from each other by a corresponding plurality of small spacer rings tightly received on the core, the spacer rings pressure sealing around the core and cooperating with adjacent primary discs in forming a plurality of closely spaced transport annuli for conveying the powder from the reservoir to the supply duct. Still another feature of this invention resides in the provision in the new and improved feeder of a plurality of secondary discs replacing a corresponding plurality of primary discs at uniform intervals along the transporters, the secondary discs carrying seals which engage an inside surface of a tube between the reservoir and a port to the supply duct to effect an outer pressure seal between the reservoir and the supply duct. And a still further feature of this invention resides in the provision in the new and improved feeder of drive and idler pulleys having circumferential grooves for receiving therein the transporter, the grooves being lined with friction material so that each of the primary and secondary discs is gripped by the pulleys to transmit driving force to the core through the primary and secondary discs and the spacer rings therebetween. These and other features of this invention will be readily apparent from the following specification and from the drawings wherein:

FIG. 1 is a plan view in section and partially broken away of a linear pocket feeder according to this invention;

FIG. 2 is a sectional view taken generally along the plane indicated by lines 2—2 in FIG. 1;

Figure 3:
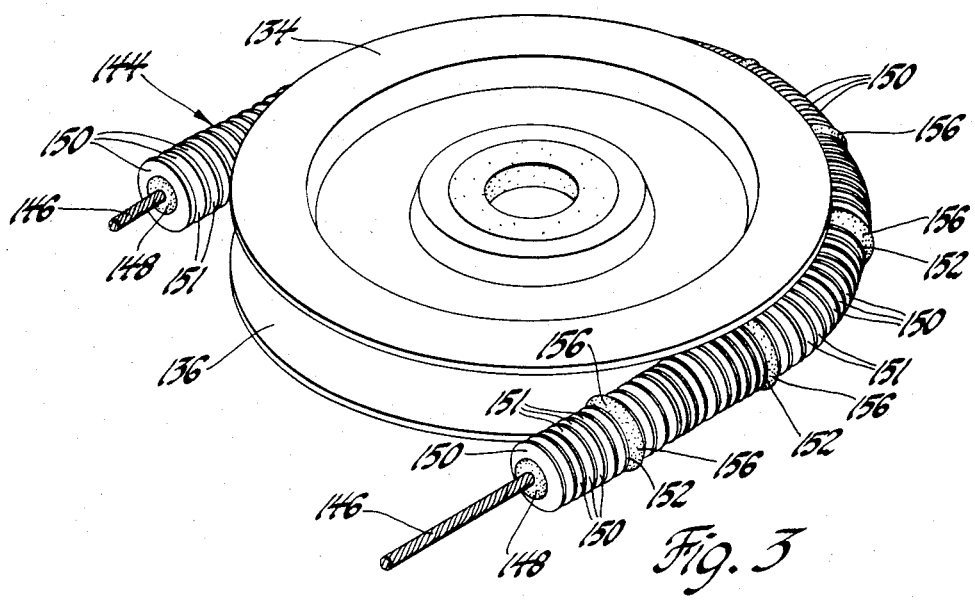
FIG. 3 is a perspective view of a portion of the linear pocket feeder according to this invention showing particularly the engagement between the transporter and the drive pulley.

Referring now to FIGS. 1 and 2 of the drawings, a linear pocket feeder according to this invention and designated generally 10 includes a generally rectangular reservoir or hopper 12 having a bottom 13 with a rectangular opening 14 therethrough. The hopper 12 rests on an upper surface 16 of a base 18 and is attached to the base by a plurality of nut/bolt assemblies 20 with a gasket 22 between the hopper and the base. A trough 24 formed in the base extends downward, FIG. 2, from an opening 26 in upper surface 16 in register with opening 14 in the bottom of the hopper to a lower surface 28. A pair of vertical wall portions 30 and 32 of the housing define the fore and aft ends of the trough 24, respectively. A pair of circular openings 34 and 36 in the wall portions 30 and 32, respectively, are aligned on a longitudinal axis 40 of the base disposed in a horizontal plane 41, FIG. 2.

An idler housing 42 includes a pair of integral cylindrical projections 44 and 46 and a bearing support tower 48 defining an axis 50. The cylindrical projection 44 is received in a socket 52 of the base 18 which aligns the cylindrical projection on the axis 40. A bore 56 in the projection 44 is undercut at 58 and receives a sleeve 60 having a bore 62 aligned on the axis 40 of the base. The sleeve is retained by a set screw 64, FIG. 1, and has a plurality of cross bores 66 which provide communication between the bore 62 and the undercut 58. The undercut 58 communicates with a source of vacuum, not shown, through a tube 68 connected to the cylindrical projection 44 by an appropriate fitting.

With continued reference to FIGS. 1 and 2, a return tube 70 having a bore 72 therethrough fits over the cylindrical projection 46 on the idler housing 42 such that the bore 72 of the tube is aligned with a corresponding bore 74 in the cylindrical projection 46. Both the return tube 70 and projection 46 are disposed in plane 41 with the other end of the return tube 70 being received over the end of a cylindrical projection 76 of a drive housing 78. The cylindrical projection 76 is disposed in plane 41 and includes a bore 82 aligned with the bore 72 in the return tube and the bore 74 in the idler housing 42. A drive shaft 84 is rotatably supported by appropriate bearings in the drive housing 78 and is rotatable at varying speeds about an axis 86 of the housing by an electric motor 88 through a gear reduction arrangement 90. The drive housing 78 is rigidly attached to the base 18 by a plurality of fasteners such as a bolt 92.

As seen best in FIG. 1, a discharge manifold 94 is disposed generally between the vertical wall portion 32 of the base 18 and a cylindrical projection 95 of the drive housing 78 disposed in the plane 41. The discharge manifold 94 is bolted to the base 18, as by a nut/bolt assembly 96 with a stepped bore 98 therethrough aligned on the axis 40 and with a cylindrical end portion 100 of the manifold received within an appropriate counterbore in the cylindrical projection 95 of the drive housing 78. A chamber 102 in the discharge manifold 94 is closed by a plug 104 and communicates with a large diameter portion 98a of the stepped bore 98 through four passages 106a–d. In addition, the chamber 102 is exposed to a source of high pressure air, not shown, through a port 108 while bore portion 98a communicates with a supply duct 110 through a passage 112 and an appropriate fitting 114.

With continued reference to FIG. 1, a sleeve 116 is disposed in the opening 36 in vertical wall portion 32 and in a small diameter portion 98b of stepped bore 98 in the manifold 94 with a bore 118 thereof aligned on the axis 40. A manifold sleeve 120 is seated in bore portion 98a against the end of connecting sleeve 116 and against one end of an exit sleeve 122 mounted in bore portion 98c and held in position by a set screw 124. The manifold sleeve 120 has a bore 126 therethrough which is aligned on axis 40 and which registers with a corresponding bore 128 through the exit sleeve 122. Four cross slots 130a–d through the sleeve 120 provide communication between respective ones of the passages 106a–d and the bore 126 through the sleeve. Similarly, across slot 132 through the sleeve 120 opposite slot 130d provides communication between the bore 126 and the passage 112 in the discharge manifold.

Referring to FIGS. 1 and 2, a drive pulley 134 is disposed in plane 41 and rigidly attached to the end of drive shaft 84 within an appropriate recess in the drive housing 78. The drive pulley 134 has a semicircular groove 136 therearound the center of which is tangent to the axis 40. Similarly, an idler pulley 138 is disposed in plane 41 and rigidly attached to the end of an idler shaft 140 supported on the tower 48 of the idler housing 42 for rotation about the axis 50. The idler pulley 138 is substantially identical to the drive pulley 134 and includes a semicircular groove 142 the center of which is tangent to axis 40. The groove 136 in the drive pulley 134 is roughened or otherwise lined with a friction enhancing material for a purpose later described as may be the groove 142 in the idler pulley.

Figure 4:
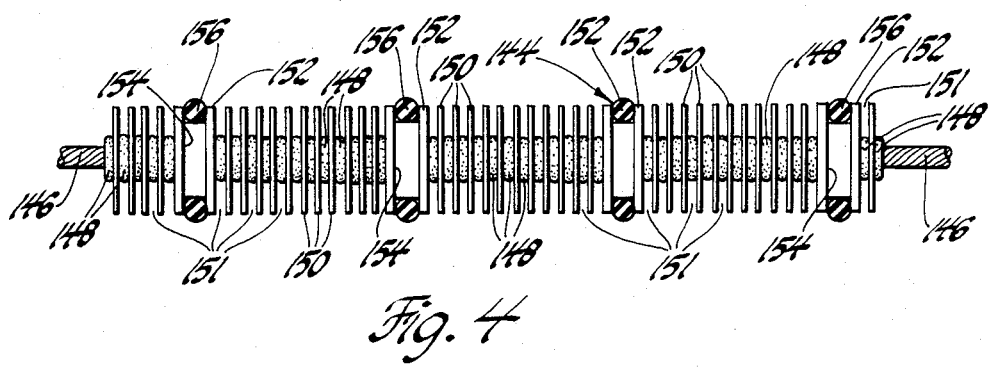
FIG. 4 is an enlarged view of a portion of FIG. 3 showing particularly the transporter.
Figure 5:
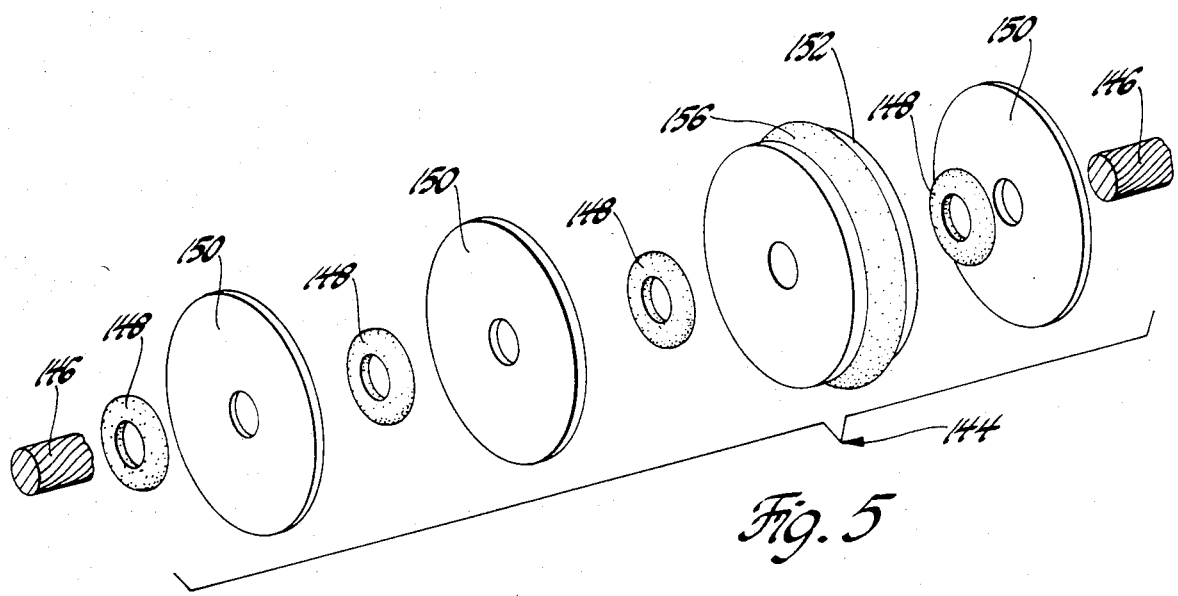
FIG. 5 is an exploded perspective view of a portion of FIG. 4.

As seen best in FIGS. 3–5, the linear pocket feeder 10 further includes a transporter 144 mounted and driven as now to be described. The transporter 144 includes a flexible wire-like core 146 forming an endless loop. A plurality of small spacer rings 148 fabricated of rubber or like material are closely received on the core 146 such that an interference fit between the core and the rings is achieved. A plurality of primary discs 150 are loosely received on the core 146 and are individually separated by respective ones of the spacer rings 148. Each of the spacer rings cooperates with the corresponding ones of the primary discs on the opposite sides thereof in defining a plurality of relatively thin transport annuli 151 around the core 146. At uniform intervals around the transporter 144 individual ones of the primary discs 150 are replaced by respective ones of a plurality of secondary discs 152. The secondary discs 152 are of the same outside diameter as the primary discs 150 but are somewhat wider, with each secondary disc having an annular groove 154 therearound, FIG. 4. A seal ring 156 of rubber or like material is disposed in the annular groove 154 of each of the secondary discs 152, the seal ring projecting radially outboard of the outside diameter of the corresponding secondary disc. Except for the seal rings, secondary discs 152 function like the primary discs 150 they replace including cooperating with adjacent ones of the primary discs and spacer rings to define transport annuli 151 on opposite sides of the secondary discs.

Describing now the operation of the linear pocket feeder with particular emphasis on the assembly of the transporter 144 and its coaction with the other described components of the feeder, assembly of the transporter 144 begins with a length of flexible wire corresponding to the size of the loop around the drive pulley 134 and the idler pulley 138. Individual ones of the spacer rings 148, the primary discs 150 and the secondary discs 152 are sequentially mounted on the core as illustrated in FIGS. 4 and 5 until a full complement is assembled. Generally, a full complement of spacer rings 148, primary discs 150 and secondary discs 152 corresponds to a stack which completely covers the length of core 146 with the spacer rings compressed between adjoining primary discs or between a primary disc and a secondary disc. The pitch or span between succeeding secondary discs is to some extent arbitrary but cannot exceed the span between the open end of sleeve 116 and slot 130a in the discharge manifold. In a working embodiment where the span was approximately 57 mm between the open end of sleeve 116 and slot 130a, a pitch of 19.05 mm between secondary discs was used.

When a full complement of rings and discs is assembled on the core 146, a free end of the latter is directed through the sleeve 60, through the trough 24 in the base 18, through the sleeve 116, the manifold sleeve 120 and the exit sleeve 122. From the exit sleeve the free end is looped around the drive pulley so that the transporter is lodged in groove 136 on the drive pulley 134. The free end is then directed through the bore 82 in the projection 76 of the drive housing and through the return tube 70 into the bore 74 in the cylindrical projection 46. From the bore 74 the transporter is looped over the idler pulley and lodged in the groove 142. The idler pulley is temporarily maintained in a non-adjusted position toward the drive pulley to facilitate assembly. With the transporter 144 thus looped around the drive pulley 134 and the idler pulley 138, localized pressure is applied at opposite ends of the stack of rings and discs on the core 146 causing localized compression which exposes the juxtaposed ends of the core. With the ends exposed conventional crimping means, not shown, are employed to join together the leading and trailing ends of the core 146 thereby forming the transporter 144 into an endless loop through the circuit just recited.

After assembly of the transporter 144, the idler pulley 138 is adjusted away from the drive pulley 134 by conventional means, not shown, to tension the transporter around the pulleys. In the process, the primary discs 150 and the secondary discs 152 are caused to seat in the semicircular grooves 136 and 142 in the drive and idler pulleys, respectively, whereby frictional engagement between the friction enhancing coatings on the grooves and the circumferences of the primary and secondary discs is achieved. The linear pocket feeder is then prepared for operation by application of vacuum to the undercut 58 around the sleeve 60 through the tube 68, by application of air pressure to the chamber 102 through port 108, and by filling the hopper 12 with powdered material.

Where the linear pocket feeder 10 is to meter powdered coal to a combustor of an automotive gas turbine engine, air pressure in chamber 102 can be supplied by a boost pump which boosts air at compressor discharge pressure to a somewhat higher pressure. Operation of the feeder is then commenced by actuation of motor 88 which rotates the drive shaft 84 and drive pulley 134 clockwise, FIG. 1. As the drive pulley rotates the frictional engagement between the peripheral edges of the primary discs 150 and the secondary discs 152 lodged in the groove 136 causes the discs to rotate with the drive pulley. While the primary and secondary discs 150 and 152, respectively, are loose on the core 146, the spacer rings 148 have interference engagement with the core so that the core 146 is pulled by the discs and spacer rings with the drive pulley 134. As the core begins to move clockwise around the loop circuit, FIG. 1, it exerts a force on each of the succeeding spacer rings 148 which, in turn, tend to pull corresponding ones of the primary and secondary discs along with the core. The transporter 144 is thus driven endlessly by the drive pulley 134 through the loop circuit described hereinbefore.

Referring particularly to FIG. 1 and describing the operation of one pitch of the transporter between a first or leading one of the secondary discs 152 and a next succeeding or trailing one of the secondary discs, it is understood that the diameters of the primary discs 150 and the secondary discs 152 are slightly smaller than the bores 62, 118, 126 and 128 in the sleeves 60, 116, 120 and 122, respectively, so that the discs pass relatively easily through the bores. The seal rings 156 on the secondary discs, however, project sufficiently beyond the outside diameters of the secondary discs 152 to slidably engage and tightly seal against the insides of the bores. Accordingly, commencing at the open end of sleeve 60 on the idler housing 42, the leading secondary disc 152 enters the sleeve and is pulled therethrough by the core 146. When the leading secondary disc reaches the cross bore 66, the trailing secondary disc has entered the sleeve 60 so that as the leading disc passes the cross bore 66 the pitch between the secondary discs is exposed to the vacuum in undercut 58. The evacuated pitch is sealed at both ends by outer seals defined between the seal rings 156 and the surface of the bore 62. Acceptable inner pressure seals are defined around the core 146 between each pair of primary discs 150 of the evacuated pitch by the spacer rings 148 which are compressed between the primary discs and stretched around the core.

As the leading secondary disc of the pitch emerges from the tube 60 into the trough 24, the finely powdered coal is drawn into each of the transport annuli 151. In addition to vacuum, filling of the annuli is further promoted by vibration of the hopper which helps prevent "rat holing" of the powder. With continued clockwise rotation of the drive pulley 134, the leading secondary disc 152 enters sleeve 116 and proceeds toward the manifold sleeve 120. Again, an outer pressure seal is defined across the leading secondary disc at the sliding interface between the seal ring 156 and the surface of bore 118 and inner pressure seals are defined at the spacer rings. Before the leading secondary ring reaches the manifold sleeve 120 the trailing secondary disc enters the sleeve 116 so that the pitch is disposed completely within the sleeve. In this position each of the transport annuli of the pitch is filled with powder at essentially atmospheric pressure.

The next phase, coal discharge, is initiated when the leading secondary disc 152 encounters and crosses slot 130a in the manifold sleeve 120. Immediately, the entire flight between the two secondary discs is exposed to air at relatively high pressure because of the clearance between the bore in the sleeve and the primary discs. Thus, the powder in each of the transport annuli of the pitch is subjected to superatmospheric pressure which is prevented from escaping by the seal ring 156 on the trailing secondary disc 152 and by the spacer rings 148 around the core 146. Continued movement of the leading secondary disc across slots 130b and 130c further reinforces the pressure build-up in the interstices between the powder particles so that when the leading secondary disc finally crosses slot 130d in the manifold sleeve 120 the powder in the transport annuli immediately adjacent the leading secondary disc effectively burst out of the annuli to be entrained in the high pressure air stream from slot 130d to slot 132. The entrained powder is then directed through passage 112 and duct 110 to the combustor. The continuous movement of the transporter brings the succeeding transport annuli into register with the slots 130d and 132 in the manifold sleeve 120 so that the powder therein is ejected from the transporter and entrained in the air stream with the aid of the residual effect of the pressurization of the pitch. Because a large number of relatively small transport annuli are rapidly carried across the slots 130d and 132 by the transporter, the powder is discharged into the air stream in a more even fashion than in heretofore known systems so that flame pulses are eliminated or reduced to tolerable levels. In addition, because outer pressure seals are affected at only spaced intervals rather than at each primary disc, the drag on the transporter resulting from sliding contact between the seal rings 156 and the surfaces of the various bores is held within acceptable limits.

Continuing, the leading secondary disc enters exit sleeve 122 where the seal ring 156 thereon engages the bore 128 to affect an outer pressure seal while the spacer rings again effect inner pressure seals. When the trailing secondary disc finally crosses the slots 130d and 132 and enters the sleeve 122 the pitch is devoid of coal powder but pressurized essentially to the pressure in chamber 102. Before the leading secondary disc 152 exits the sleeve 122, the pitch is exhausted to atmospheric pressure by any convenient system, not shown, so that when the leading secondary disc exits the sleeve the entire pitch is stabilized at atmospheric pressure.

After exiting sleeve 122, the leading secondary discs and each of the following primary discs are drawn into groove 136 in the drive pulley where frictional engagement between the circumferential edges of the discs and the groove operates to pull the following pitches of the transporter through the circuit just described. Of course, the tension exerted on the core 146 by the drive pulley also operates to pull the transporter over the idler pulley and to pull the transporter from the drive pulley to the idler pulley. Accordingly, after traversing the groove 136 on the drive pulley the leading secondary disc and each succeeding disc are pulled through the bore 82 in the projection 76, through the bore 72 in the return tube 70, through the bore 74 in the projection 46 on the idler housing, the then into the groove 142 on the idler pulley. Finally, the leading secondary disc and each succeeding disc exit the idler pulley in preparation for entry into sleeve 60 and a repeat of the cycle just described.

The embodiments of the invention in which an exclusive property or privilege is claimed are defined as follows:

1. In a linear pocket feeder for transporting powder from a reservoir at a low pressure to a supply duct at a relatively higher pressure including a sleeve means having an open end in said reservoir and a discharge port to said supply duct, a drive pulley on one side of said sleeve means, and an idler pulley on the opposite side of said sleeve means, a transporter comprising, a flexible core defining an endless loop, a plurality of annular elastomeric spacer rings stretched over said core and resiliently gripping the latter at predetermined intervals around said loop, a plurality of annular primary discs each loosely received on said core between respective pairs of said spacer rings such that each of said spacer rings is longitudinally compressed against each adjacent primary disc, said spacer rings and said primary discs cooperating in defining a plurality of transport annuli on said core having inboard pressure seals at the interfaces between said spacer rings and said primary discs, said endless loop core with said spacer rings and said primary discs thereon being looped around said drive and said idler pulleys with a linear portion extending through said sleeve means, means on said drive pulley operative to sequentially engage each of said primary discs on the portion of said core looped therearound and to carry each of said engaged primary discs therewith during rotation thereof whereby tension is applied to said core through said spacer rings and said transport annuli are continuously pulled through said sleeve means, and a plurality of secondary disc means substituted for a corresponding plurality of said primary discs at uniform intervals around said endless loop not exceeding the linear distance between said open end and said discharge port of said sleeve means, said secondary disc means slidably sealing against said sleeve means to provide an outboard pressure seal between said open end and said discharge port of said sleeve means.

2. The transporter recited in claim 1 wherein said means on said drive pulley operative to sequentially engage each of said primary discs includes means on said drive pulley defining a circumferential groove having a semicircular transverse cross section of diameter generally equal to the diameters of said primary discs, and friction means on said circumferential groove whereby as each of said primary discs sequentially enters said groove said primary disc is frictionally engaged by said drive pulley over about one half of the circumference of said primary disc.

3. In a linear pocket feeder for transporting powder from a reservoir at a low pressure to a supply duct at a relatively higher pressure including a sleeve means having an open end in said reservoir and a discharge port to said supply duct, a drive pulley on one side of said sleeve means, and an idler pulley on the opposite side of said sleeve means, a transporter comprising a flexible core defining an endless loop, a plurality of annular elastomeric spacer rings stretched over said core and resiliently gripping the latter at predetermined intervals around said loop, a plurality of annular primary discs each loosely received on said core between respective pairs of said spacer rings such that each of said spacer rings is longitudinally compressed against each adjacent primary disc, said spacer rings and said primary discs cooperating in defining a plurality of transport annuli on said core having inboard pressure seals at the interfaces between said spacer rings and said primary discs, said endless loop core with said spacer rings and said primary discs thereon being looped around said drive and said idler pulleys with a linear portion extending through said sleeve means, means on said drive pulley defining a circumferential groove having a semi-circular transverse cross section of diameter generally equal to the diameters of said primary discs, the ones of said primary discs on the portion of said core looped around said drive pulley being received in said circumferential groove, means lining said circumferential groove and operative to enhance frictional engagement between said drive pulley and the edges of each of said primary discs received therein so that each of said primary discs in said groove is carried by said drive pulley during rotation thereof whereby tension is applied to said core through said spacer rings and said transport annuli are continuously pulled through said sleeve means, a plurality of secondary discs substituted for a corresponding plurality of said primary discs at uniform intervals around said endless loop not exceeding the linear distance between said open end and said discharge port of said sleeve means, means defining a circumferential groove in each of said secondary discs, and a plurality of seal rings disposed in respective ones of said secondary disc grooves, each of said seal rings slidably sealing against said sleeve means to provide an outboard pressure seal between said open end and said discharge port of said sleeve means.

* * * * *